United States Patent Office 3,410,094
Patented Nov. 12, 1968

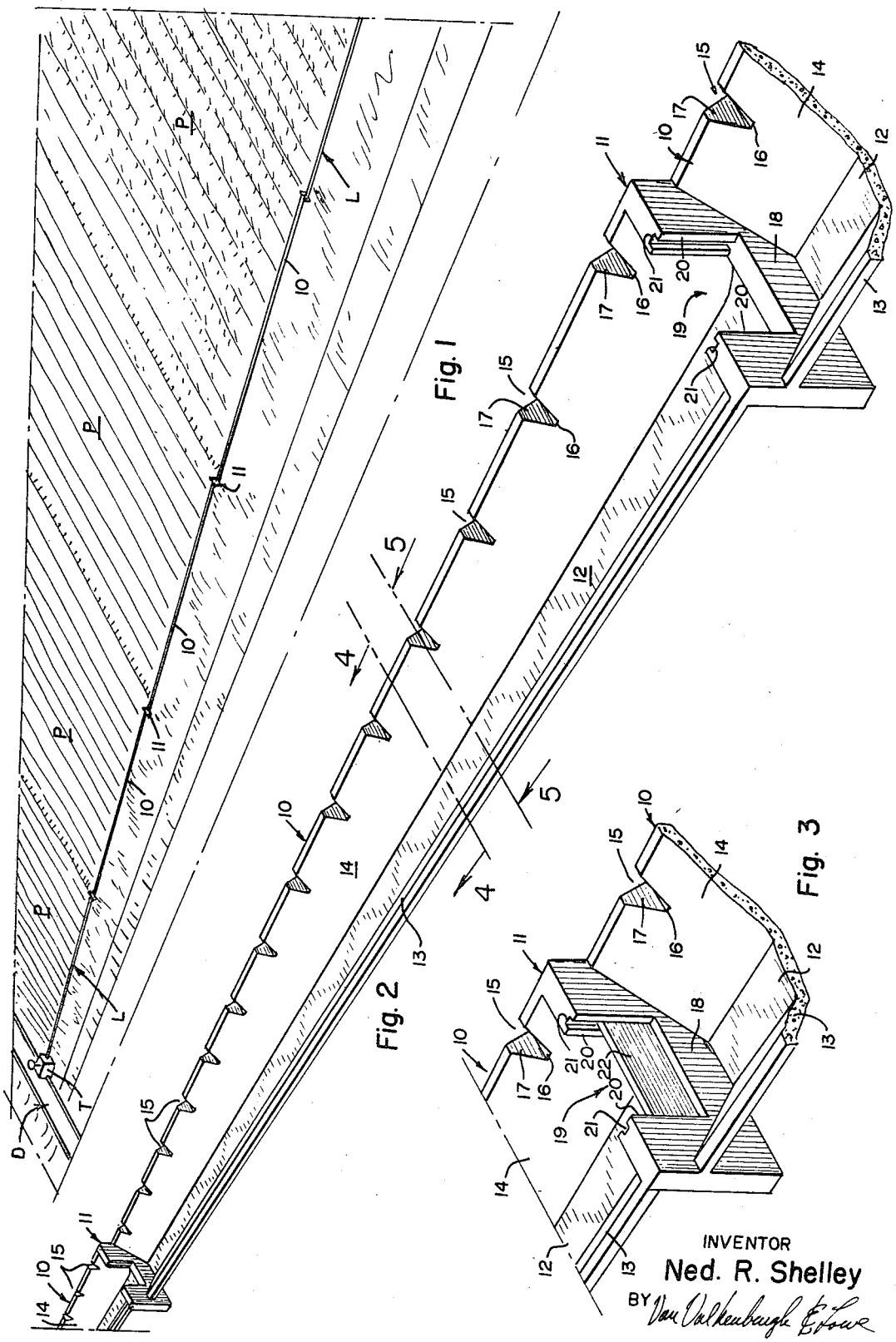

3,410,094
DISTRIBUTION LATERAL FOR AN
IRRIGATION DITCH
Ned R. Shelley, Box 747, Riverton, Wyo. 82501
Filed June 17, 1966, Ser. No. 558,505
5 Claims. (Cl. 61—12)

ABSTRACT OF THE DISCLOSURE

A distribution lateral for an irrigation ditch to distribute water from the ditch into a field and directly into field furrows spaced alongside the ditch. The lateral, a concrete ditch structure, preferably trapezoidal in cross section, is built as a tandem sequence of carefully leveled reaches or sections of a selected length. A gate controlled drop structure is provided at the end of each section. The freeboard of each section, that is the portion of the ditch sides above the water level therein at maximum flow, is notched by a regular spacing of uniform, narrow notches, to permit water to flow therefrom and onto the field furrows.

---

The present invention relates to irrigation ditches and more particularly to the distribution laterals of an irrigation ditch system which discharge the water directly onto a field. As such, the invention will be sometimes referred to as a "distribution lateral."

A primary object of the invention is to provide a novel and improved construction of a distribution ditch system by combining a sequence of ditch sections as unit sections in a manner which makes possible a more effective application of water to a field and especially to fields of substantial acreage where the irrigation operations must proceed in a sequential manner, as by irrigation of one portion or plot of the land at a time.

A typical irrigation system in many western states of the country will commence with a main ditch which draws its water from a reservoir or river. Thence, the ditch will divide into a system of primary laterals extending from the main ditch and to the individual farms and ranches under the ditch. The irrigation structure for each individual farm or ranch will include one or more distribution laterals, which extend from a primary lateral and across the farm land in a manner which permits water to be turned onto the fields for various purposes such as for flooding or flowing into rows between the crops.

The manner in which the water is distributed is ordinarily controlled first, by the State Engineer or reservoir owner who will allocate the flow to the main ditch. An officer or employee of the ditch company will regulate and allocate the flow into the primary laterals to give each farm or ranch a proper share of the water. Ordinarily, the flow of water to the farmer's or rancher's distribution lateral is at a specified rate for a selected period of time. It is then the farmer's or rancher's responsibility to turn this water from the distribution lateral and onto his fields in any effective manner to irrigate his land with the allocated flow, which may of course vary from time to time depending upon the amounts of water available.

Obviously, the final operation of turning the water out of the ditch and distributing it over a field is the laborious, expensive and time-consuming part of the entire operation. Several systems are used to do this. The distribution lateral may be provided with turnouts at selected sections along the ditch. Such turnouts are usually directed into shallow temporary ditches alongside the lateral which are cut at desired intervals for effectively spreading the water, as into furrows or across the field.

In order to save the labor of forming such temporary ditches, syphon tubes are often used which may be moved along the ditch as desired. However, this also involves a substantial amount of labor and the rancher must continually attend the ditch to move tubes and to check the flow in the distribution lateral. In order to avoid the labor of such operations, many ranches have installed expensive sprinkler systems.

There is a real and definite need for a more simple and facile operation which will permit a rancher to turn water onto a field from a distribution ditch and into his fields. The present invention was conceived and developed with such considerations in view and it comprises, in essence, a distribution lateral constructed as a sequence of uniform reaches or sections in tandem, with the length of the sections approximately the same and with a gate controlled hydraulic drop structure located at the downstream end of each section. Each reach or section is notched in the freeboard portion of one or both sides in a regular sequence of uniform, level, narrow notches. Thus, whenever water is backed up in the ditch to the freeboard level, as by closing a gate at the downstream drop, flow through the notches permits a uniform distribution of water across the field alongside the section. This control of the distribution of flow in the tandem aligned sections is quickly and easily shifted from one section to another by shifting the control gates at the hydraulic drops.

Accordingly, another objection of the invention is to provide a novel and improved distribution lateral of an irrigation ditch arranged as a sequence of sections, which is adapted to carry a specified flow, and to either pass the entire flow through any one section or to turn the flow out of that section and into a field plot.

Another object of the invention is to provide a sectioned distribution lateral which may selectively irrigate one or more selected plots of a field at a time and permit, with a minimum of effort on the part of the farmer or rancher, a quick change of irrigation water distribution to turn the water onto other plots in the field.

Another object of the invention is to provide a novel and improved distribution lateral for an irrigation ditch which is adapted to permit the water flowing in the ditch to be turned out on one plot of land and then to be shifted to turn onto another plot in a field without the necessity of adjusting the flow in the ditch each time the shift is effected.

Another object of the invention is to provide a novel and improved distribution lateral which is adapted to uniformly disperse irrigation flow across a field alongside the ditch with a minimum of effort on the part of the farmer or rancher.

A further object of the invention is to provide a novel and improved lateral for an irrigation ditch system which is adapted to disperse and to turn water onto a field alongside the ditch with a remarkable degree of uniformity, all to facilitate irrigation of an entire plot in a field in a minimum of time.

Other objects of the invention are to provide a novel and improved distribution lateral which is advantageously formed as operative unit sections, may be arranged in a modular manner to facilitate and simplify field irrigation, and is a simple, low-cost, rugged and durable structure.

With the foregoing and other objects in view, all of which more fully hereinafter appear, my invention comprises certain constructions, combinations and arrangements of parts and elements as hereinafter described, defined in the appended claims and illustrated in the accompanying drawings in which:

FIGURE 1 is a somewhat diagrammatic, perspective view of a portion of farm land divided into plots alongside a distribution lateral constructed according to the invention, and showing also, a fragment of an irrigation ditch and a turnout structure at the ditch and into the distribution lateral.

FIGURE 2 is a somewhat diagrammatic, perspective view of a portion of the lateral shown at FIG. 1 as being out of the ground, the view being on a greatly enlarged scale, and the figure illustrating one complete section of the lateral and fragmentary portions of adjacent sections at each end thereof.

FIGURE 3 is a fragmentary perspective view of one end of the showing at FIG. 2 but with a simple gate control placed in the drop structure at the end of the section.

Figure 6:
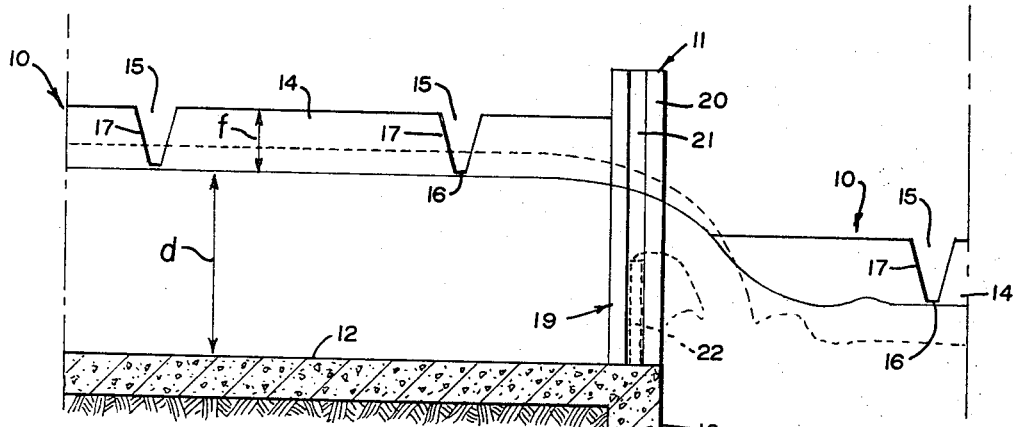

FIGURE 6 is a fragmentary longitudinal sectional view as taken from the indicated line 6—6 at FIG. 2, but on an enlarged scale, and with a solid line indicating a normal water depth when the ditch is flowing full, and with broken lines indicating the manner in which a barrier placed at the terminal drop of the unit section increases the depth of the section to effect distribution into a field at the side of the ditch.

Figure 7:
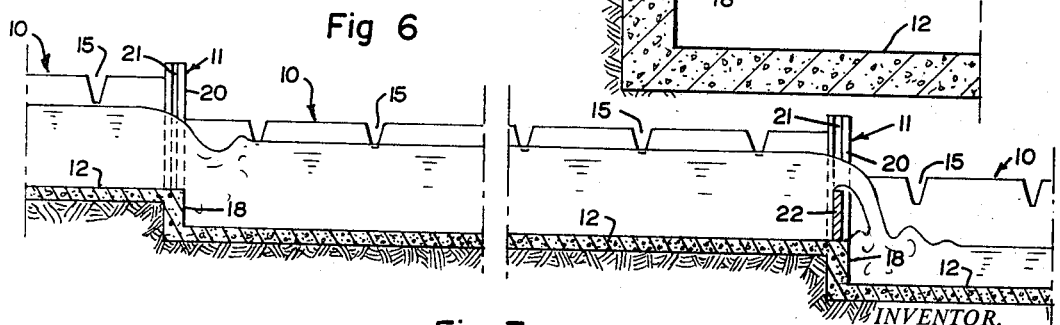

FIGURE 7, similar to the showing at FIG. 6, is a reduced-scale longitudinal sectional view of a ditch unit section, and with the central portion thereof broken away to conserve space, with portions of the adjoining upstream and downstream unit sections being shown to illustrate the continuity of the ditch and with an indicated water level through the ditch being controlled to effect distribution from the section by the expedient of blocking up the downstream drop structure of the ditch section.

Referring more particularly to the drawing, the perspective view at FIG. 1 illustrates a portion of a water supply ditch D, usually a lateral which extends from a main irrigation ditch or other water source. A turnout T is provided in the ditch D to connect with the improved terminal distribution lateral L. This turnout T is ordinarily a simple structure such as a gate, and when it is opened it is usually capable of supplying the maximum flow to be allowed in the distribution lateral L.

The distribution lateral L, constructed according to the principles of the invention, consists of a sequence of unit sections 10 interconnected by drops 11. Each section 10 is preferably substantially the same as the others, each having the same cross section, gradient and length so that the flow characteristics of the sections will be the same. The cross section and gradient are established by the amount of flow the ditch is to carry, based on reasonable limitations of velocity in the ditch. The length of each section may be any selected distance which will correspond to an array of agricultural plots P in the field which is irrigated, and preferably a length which will become a module of the system of field plots. Any suitable length may be used for such a module, such as, for example, 100 feet which will preferably, but not necessarily, be the same for each section.

The head of the distribution lateral, at the turnout T, is the high point of the field and extends across the upper boundary of the field plots P with a downhill slope along the course of the ditch lateral and with a downhill slope across the field laterally of the ditch lateral. The ground slope along the course of the ditch lateral is invariably steeper than a desirable ditch slope in all but the flattest of fields. In a distribution lateral constructed according to the invention, each unit section 10 is formed as a substantially level structure and in field constructions, each section will be as level as is possible to build it, with the top of each section being at the approximate ground level in its reach and with the terminal drop 11 permitting the next succeeding section to be at a lower elevation and also at the approximate ground level within its reach. It is contemplated that the ground surface alongside each ditch section can be easily graded to permit lateral distribution from a section as will be further described, and also that the height of the drops 11 can be varied so that the unit sections 10 of the distribution lateral L can be used in either flat or steeply sloping fields. The extent of a distribution lateral L is usually a thousand feet or more and thus the lateral L may have as many as ten unit sections 10. However, the length may be a mile or more where a large tract of land is under cultivation.

Each unit section 10 of a lateral L is constructed in a conventional manner. It is ordinarily made of concrete or any similar rigid material. It is preferably formed as a trapezoid in cross section, having a width and depth such that it will have a capacity sufficient to receive and pass the maximum water flow allotted to the ditch with the water remaining at a selected level, ordinarily six to twelve inches below the top of the ditch, this top portion being ordinarily called the freeboard of the ditch. The slope or gradient of an irrigation ditch is comparatively flat for the water should never flow in a ditch at high velocities in excess of a so-called critical velocity. In comparatively short reaches, such as 100 feet, an irrigation ditch will appear almost level and in the present invention, it was found that each unit section 10 could be advantageously constructed as a level or nearly level reach. It was found that a levelled unit section 10 would operate efficiently and that the trapezoidal cross section could be easily proportioned to provide a flat hydraulic gradient of flow through it which would cause no significant problems when a maximum amount of water was flowing through the ditch. Moreover, the levelled section 10 will be very effective in providing a lateral distribution of flow from the ditch and to a field plot as will be explained.

The trapezoidal unit section 10 includes a floor 12 and opposing, outwardly inclined sidewalls 13 and 14, a preferable angle of inclination being 45 degrees. The height of the walls is sufficient to retain a depth D of water which occurs when the ditch is flowing at its maximum capacity. In addition, good ditch design demands that these walls 13 and 14 be extended to provide a reasonable freeboard depth F above the design depth D, as in the manner indicated at FIG. 5. It is to be noted that the use of a freeboard to accommodate an excess flow as in an emergency is almost universal, and is required by practically every large ditch company.

The present invention, however, contemplates the use of the freeboard portion of the ditch section 10 as the structure which carries the means for distribution of water onto a plot P of land adjacent to the ditch section. An array of notches 15 is formed in the freeboard of the wall 14 adjacent to the plot P so that whenever the water depth in the section is greater than the normal depth D, water will flow from the ditch through the notches 15. Each notch is formed as a narrow slot-like structure having a laterally extended flat bottom portion 16 at an elevation slightly above the design depth D. The notch is narrow and with outsloping sidewalls 17. The bottoms of the notches are carefully levelled when the ditch section is set in the field for it was found that when a comparatively small flow in the irrigation ditch was backed up in a section, as by blocking off the flow at the drop 11 at the downstream end of the section, the flow rate from the individual notches would be substantially uniform throughout the entire reach of the section. Adjustments may be required insofar as the notch at the head of the ditch section is concerned because of the flow disturbances at the drop 11, but such is a minor factor, easily established by a field test.

Figure 4:
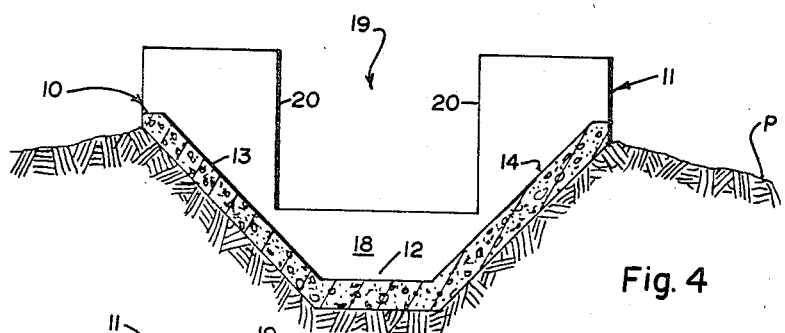
FIGURE 4 is a transverse sectional elevational view as taken from the indicated line 4—4 at FIG. 2.
Figure 5:
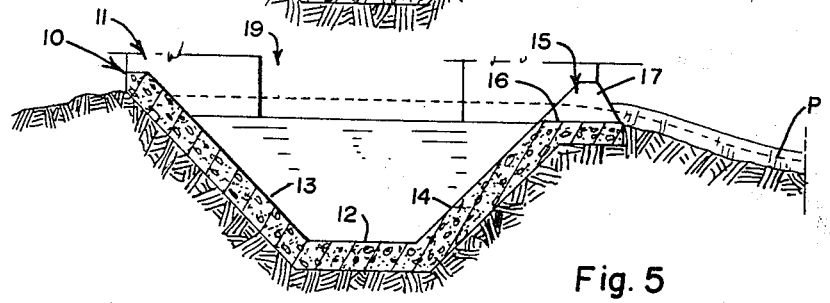
FIGURE 5 is a transverse sectional elevational view as taken from the indicated line 5—5 at FIG. 2 but illustrating water in the ditch at a normal level when flowing full and illustrating further, in broken lines, the water level in the ditch as when it is raised to turn water out of the ditch and provide irrigation water to the adjacent land.

A field planted in row crops is ordinarily irrigated by water flow in furrows between the crop rows. One standard of spacing between rows is 22 inches, and the notches 15 are set so that each will flow water to one or more rows. A preferred spacing of the notches is at 44 inches so that the flow from each notch will be directed to a pair of row furrows. As aforestated, each terminal distribution lateral section 10 is set into the ground with the ground surface alongside the section being suitably levelled. As indicated at FIGS. 4 and 5 the manner in which the ground surface is prepared will permit trenches to be formed in the soil adjacent to the lateral which will lead directly to the individual furrows in the field. As a result of this arrangement an entire plot of land alongside a ditch section can be irrigated in an effective manner with a remarkable degree of uniformity with practically no effort on the part of the farmer beyond the operation of closing off the downstream drop 11 to back water into the section 10. It is to be noted that the number and size of notches in any one section should be such that when desired the entire flow allocated for the lateral can be bypassed through the notches. This is desirable when the field plot alongside the section is to be rapidly flooded.

Each drop 11 is a gate controlled structure, and may be formed as an upright, transversely disposed wall abutted to the end of a section 10 and with a skirt portion 18 extending below the floor 12 of the section to connect with the floor of the next succeeding section 10 downstream. A rectangular opening 19 is formed in each drop structure which is centered with respect to the longitudinal axis of the section. The bottom of this opening is at the floor 12 of the section 10. The walls 20 of this opening are formed with opposing slots 21 which are adapted to receive a rectangular gate or barrier 22 such as illustrated at FIG. 3. The width of this opening 19 is such that the channel will flow to its required capacity at the design depth D whenever no barrier 22 is placed in the opening. Accordingly, a barrier 22 will cause water to back up in the channel to increase the water depth for any given flow and it follows that the proper selection of barriers of various height can be used to effectively increase the depth of water in a ditch section 10 to the point where the entire flow of the ditch or any portion of the flow will be turned from the section and onto the adjacent field plot P. Moreover, it is contemplated that these gating barriers 22, which may be formed as simple wooden planks, can be removed from one drop structure 11 and placed in another drop structure, and that such operation will be all that is necessary to divert the flow from one section to another.

This latter result is especially possible whenever the several sections 10 are built in the same manner and possess the same hydraulic characteristics. It is to be noted that a backup of water in one ditch section 10 will not affect the water depth in upstream sections because of the restriction of the opening 19, through which the water flows, combined with the sudden drop in elevation to the downstream section. This causes the water to fall sufficiently to gain in velocity and to exceed the critical velocity at the opening 19.

Following a common irrigation practice, an irrigation ditch is allotted a decreed flow in cubic feet per second, and a similar allotment of flow is given a distribution lateral, but for a selected period of time, say, for example, a five-hour period. It is the farmer's job to disperse this water over his fields in a selected manner consonant with the type of crops he is growing. Ordinarily, the farmer will discharge the entire head of water onto one or a few plots depending upon the type of irrigation desired. The water flow will be continued for a short period and then the farmer will move the water to other plots. The present invention is uniquely adapted to facilitate such practice. For example, consider a lateral having ten sections and ten plots alongside the sections, and a five-hour allotment of water, should the farmer desire to turn the entire flow of the lateral onto a single plot for a short period of time as for flooding, it becomes a simple matter to select a barrier 22 which is high enough to block off the entire ditch flow. The barrier is then moved from one section to another every half-hour interval. The entire flow is distributed from the section which is blocked by the barrier 22 but passes through the sections upstream without interference.

Should it be desirable to divert only a portion of the water from a given section and permit the remainder to flow downstream to other sections, a smaller barrier 22' may be used in the drop at the end of the section with the flow occurring as in the manner illustrated at FIG. 7. The maximum allocated flow passes through the upstream section without interference. The barrier 22' in the section where the diversion is occurring is designed to impede the flow through the section, raise the level of water therein but not to stop the flow therethrough. Accordingly, the level of the water is raised and a portion of the flow passes through the notches in the section. The remainder of the water may pass downstream to another section where another barrier 22 may be used to block another portion of or all of the flow. Thus the distribution flow from the several sections 10 can be set at any desired pattern, and by the movement of barriers 22 from one section to another, the pattern can be repeated, section by section, over the entire course of the ditch by the simple expedient of shifting the barriers from one drop to another.

Although the desirability of having all sections 10 in the lateral L of the same in length and in hydraulic characteristics is manifest, several variations are easily possible. For example, no significant variation occurs in a given section of a greater length than the others when it has the same number of notches as does the others. Furthermore, sections of varying length and having various numbers of notches can be advantageously used although a sequential operation with two or more barriers 22 hereinbefore described may not be practical. Further modifications reside in using suitable fillers in certain of the notches depending upon the type of irrigation operation under way.

I have now described my invention in considerable detail, however, it is obvious that others skilled in the art can build and devise alternate and equivalent constructions which are nevertheless within the spirit and scope of my invention. Hence, I desire that my protection be limited, not by the constructions illustrated and described, but only by the proper scope of the appended claims.

I claim:

1. A distribution lateral for irrigation adapted to convey a specified maximum flow and comprising:
    (a) a plurality of level ditch reaches arranged in tandem, with a drop between each adjacent reach and with each reach having substantially the same length as the others;
    (b) a uniform cross section in each ditch reach formed as a bottom portion and side walls, with the side walls being proportioned to extend above the normal water surface level when said specified maximum flow is in the ditch, to constitute the freeboard of the section;
    (c) a gate means at each drop adapted to be closed sufficiently to impede a flow through the drop and to cause the water surface in the reach upstream therefrom to back up and to rise above the normal water surface level and into the freeboard portion; and
    (d) a plurality of notches in a freeboard portion arranged along each reach at a regular spacing and at the same level, said notches each being of the same form, whereby each will provide substantially the same lateral discharge whenever the gate means is closed sufficiently to back water into the freeboard portion.

2. The distribution lateral defined in claim 1 wherein said notches are narrow, vertical, slot-like members.

3. In the distribution lateral defined in claim 1 wherein the ditch is trapezoidal in cross section having a bottom and outwardly sloping sidewalls and wherein the notches at the freeboard section are formed as comparatively narrow slots having their bottoms at a common elevation.

4. In the distribution lateral defined in claim 1 wherein said drop structure is a rectangular opening having opposing notches in walls thereof and said gating means includes a flat, rectangular member adapted to be placed in the opening within the notches.

5. In the distribution lateral defined in claim 1 wherein each section is of the same length gradient and cross section as the other sections, the notch pattern is substantially the same in each section, and said drop section openings are the same, and said gating means comprises a member adapted to be fitted in an opening and which may be shifted from one drop structure opening to another to effect the same diversion flow from any given section when there is a uniform flow into the lateral.

References Cited
UNITED STATES PATENTS

| | | | |
|---|---|---|---|
| 346,920 | 8/1886 | Jessup | 61—12 |
| 1,277,332 | 8/1918 | McNutt | 61—12 |
| 1,772,518 | 8/1930 | Pardini | 61—12 X |
| 2,582,515 | 1/1952 | Warp | 61—12 |
| 3,114,243 | 12/1963 | Winters | 61—12 |

EARL J. WITMER, *Primary Examiner.*